United States Patent
Hamadi et al.

(10) Patent No.: US 7,222,149 B2
(45) Date of Patent: May 22, 2007

(54) ORDERING DECISION NODES IN DISTRIBUTED DECISION MAKING

(75) Inventors: Youssef Hamadi, Cambridge (GB); Yek Loong Chong, Cambridge (GB); Marc Shapiro, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 10/943,279

(22) Filed: Sep. 17, 2004

(65) Prior Publication Data

US 2006/0064690 A1 Mar. 23, 2006

(51) Int. Cl.
*G06F 15/16* (2006.01)
(52) U.S. Cl. .............. 709/201; 709/238; 709/243; 345/440
(58) Field of Classification Search ........ 709/201–202, 709/238–239, 242–244; 706/45–46; 717/154–156, 717/161, 16; 345/440–441; 700/83
See application file for complete search history.

(56) References Cited

U.S. PATENT DOCUMENTS

| 4,885,684 | A | | 12/1989 | Austin et al. |
| 4,953,106 | A | * | 8/1990 | Gansner et al. ............. 345/440 |
| 6,044,222 | A | * | 3/2000 | Simons et al. ............. 717/156 |
| 6,076,083 | A | * | 6/2000 | Baker ......................... 706/52 |
| 6,154,778 | A | | 11/2000 | Koistinen et al. |
| 6,230,312 | B1 | | 5/2001 | Hunt |
| 6,499,137 | B1 | | 12/2002 | Hunt |
| 6,516,350 | B1 | | 2/2003 | Lumelsky et al. |
| 6,671,737 | B1 | * | 12/2003 | Snowdon et al. ........... 709/243 |
| 7,027,448 | B2 | * | 4/2006 | Feldmann et al. .......... 370/401 |
| 7,035,937 | B2 | * | 4/2006 | Haas et al. ................. 709/239 |
| 2005/0172306 | A1 | * | 8/2005 | Agarwal et al. ............ 719/328 |

OTHER PUBLICATIONS

Hamadi Y. et al; "Interleaved Backtracking in Distributed Constraint Networks" International Journal on Artificial Intelligence Tools, v.11, n.2, 2002, pp. 167-188.
Hamadi Y. et al.; "Backtracking in Distributed Constraint Networks" 13th European Conference on Artificial Intelligence, 1998, pp. 219-223.

* cited by examiner

Primary Examiner—Bharat Barot

(57) ABSTRACT

A system includes a weighted directional dependency graph defining one or more dependency links in a distributed system having a plurality of nodes. A weight is defined for each of the dependency links. A node ordering module generates a node order based on a cycle-cut set identifying at least one of the dependency links that is part of a cycle in the weighted directional dependency graph to create an output directional dependency graph. A method for ordering a plurality of decision nodes in a distributed system includes generating a weighted directional dependency graph, determining a cycle-cut set identifying one or more dependency links that are part of a cycle in the weighted directional dependency graph, and ordering the plurality of decision nodes based on the cycle-cut set.

25 Claims, 8 Drawing Sheets

ORDERING DECISION NODES IN DISTRIBUTED DECISION MAKING

TECHNICAL FIELD

The described subject matter relates to distributed decision making. More particularly, the subject matter relates to exploiting dependency relations in distributed decision making.

BACKGROUND

Distributed systems can be very effective in problem solving or decision making. A distributed system is made up of multiple nodes or decision centers that can each handle a portion of a problem to be solved. Distributed decision making involves achieving a system-wide (i.e., global) decision based on multiple local decisions made by the decision centers within the system. Because no decision center has a complete view of the global problem, distributed decision making is not a trivial task. Frequently, decisions made by one decision center are dependent upon, or constrained by, decisions or data generated by other decision centers. Such constraints can lead to what is referred to as "distributed backtracking."

Distributed backtracking refers to reconsideration of a previously made decision by a decision center based upon decisions or data generated by other decision centers. Distributed backtracking can involve complex repeated decision making involving many groups. For example, group A's decision may depend on the decisions from groups 'B' and 'C', while group B's decision depends on the decision from group 'A'. After group 'A' makes its decision, group 'A' must re-visit its decision after group 'B' makes its decision, and so on. As a result, distributed backtracking can be very costly, particularly in large, highly interdependent systems.

One approach to handling distributed backtracking involves ordering of local decision-making centers such that the decision making process propagates from upstream centers to downstream centers. Each downstream center waits for decisions from upstream centers and attempts to make its decision. This approach assumes that the decision made by each center will be compatible with the decisions made by the upstream centers. In some situations, however, downstream decision centers cannot make a decision that is compatible with decisions made by upstream decision centers. A traditional solution to this problem is to have controlled backtracking towards upstream centers. However, as discussed above, excessive backtracking can have significant drawbacks.

SUMMARY

Implementations of systems and methods order decision nodes in a way that minimizes distributed backtracking for distributed decision making. Ordering decision nodes involves determining a cycle-cut set that contains one or more dependency links that form cycles in a dependency graph. The cycle-cut set is determined based on weights assigned to dependency links that indicate the importance of the associated dependencies. One implementation of the cycle-cut set selects dependency links having minimized aggregate weight. Decision nodes are then arranged in an order according to the cycle-cut set. The order is dependency-compliant while reducing the likelihood of distributed backtracking in the decision making process.

DETAILED DESCRIPTION

Exemplary Operating Environment

Figure 1:
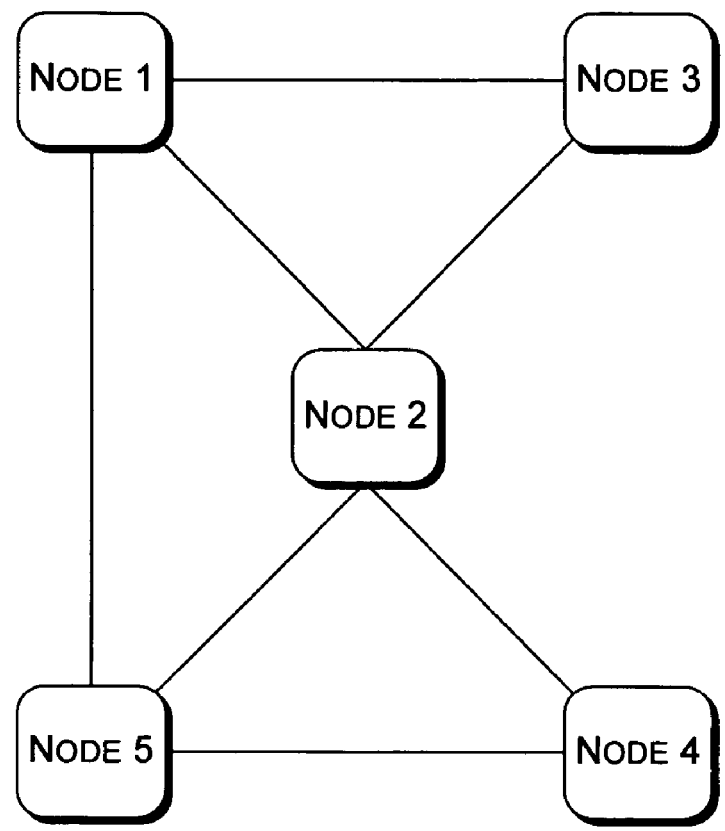
FIG. 1 illustrates an exemplary distributed system that carries out distributed decision making.

FIG. 1 illustrates an exemplary distributed system 100 that carries out distributed decision making (i.e., distributed problem solving). The exemplary distributed system 100 makes global decisions or solves problems based on related inputs, decision constraints, and problem definitions. To assist in making the global decisions, the distributed system 100 includes five decision nodes, labeled node 1, node 2, node 3, node 4, and node 5. Each of the nodes participates in making the global decisions by generating local decisions or solving local problems given the inputs, decision constraints, and problem definitions.

The nodes in FIG. 1 are illustrated as being connected in an exemplary manner. As shown, for example, node 1 is connected to node 2, node 3, and node 5. A connection between two nodes indicates that the two nodes share at least one constraint in the decision-making process. This can mean, for example, that some part of a decision made by a first node depends on some part of the decision made by another node.

In general, a node is a processing location in a communication network. More particularly, in accordance with the various implementations described herein, a node is a process or device that is uniquely addressable via a network. By way of example, and not limitation, individually addressable computing devices, groups or clusters of computing devices that have a common addressable controller, addressable peripherals, and addressable switches and routers, as well as processes executing on such devices, are all examples of nodes. A node may be implemented in hardware or software or any combination of hardware and software.

Communication between and among the nodes in the distributed system 100 can be carried out in accordance with various protocols and across various types of networks. By way of example, the nodes may communicate by way of peer-to-peer or broadcast communications. To illustrate further, the nodes may communicate via push or pull technology, packet-switched networks, e-mail, messaging, or otherwise. Thus, for example, the nodes may communicate via an Intranet, an Extranet, or the Internet, and may use a Hypertext Transport Protocol (HTTP).

Figure 2:
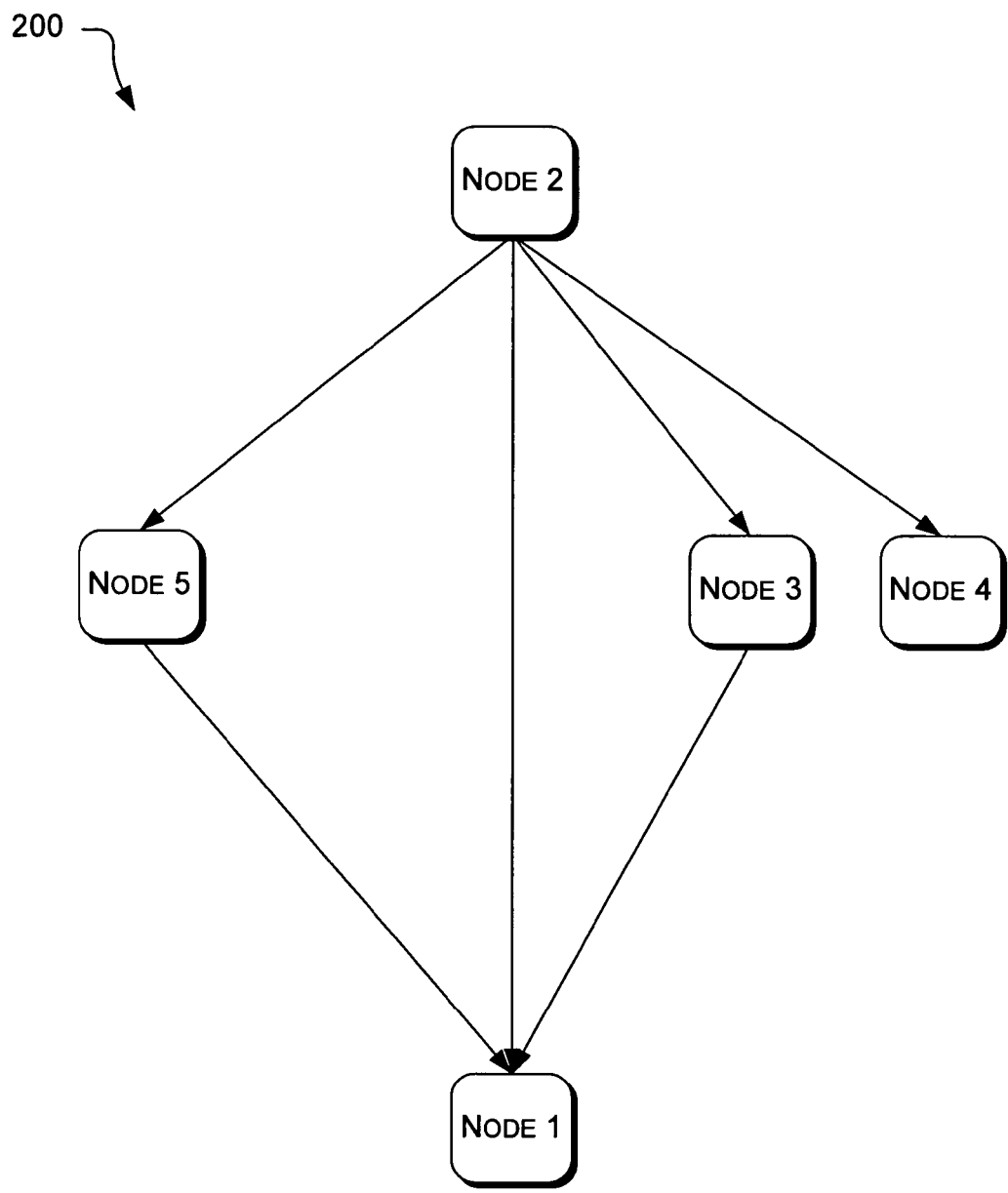
FIG. 2 illustrates an exemplary distributed ordering graph based on the distributed system of FIG. 1.

FIG. 2 illustrates an exemplary distributed ordering graph 200 based on the distributed system of FIG. 1. The ordering graph 200 represents a hierarchy of the nodes in the distributed system that dictates the sequence of decision-making. The nodes in the ordering graph 200 have arrows that indicate the order in which decisions can be made to solve a problem. As illustrated, node 2 is first in the order.

There are four paths of decision making. A first path includes, in order, node 2, node 5, and node 1. In the first path, node 2 is 'upstream' from node 5 and node 1. Conversely, in the first path node 5 and node 1 are 'downstream' from node 2, and node 1 is downstream from node 5. In the second path node 1 is downstream from node 2. In a third path, node 1 is downstream from node 3, which is downstream from node 2. In the fourth path, node 4 is downstream from node 2.

Figure 3:
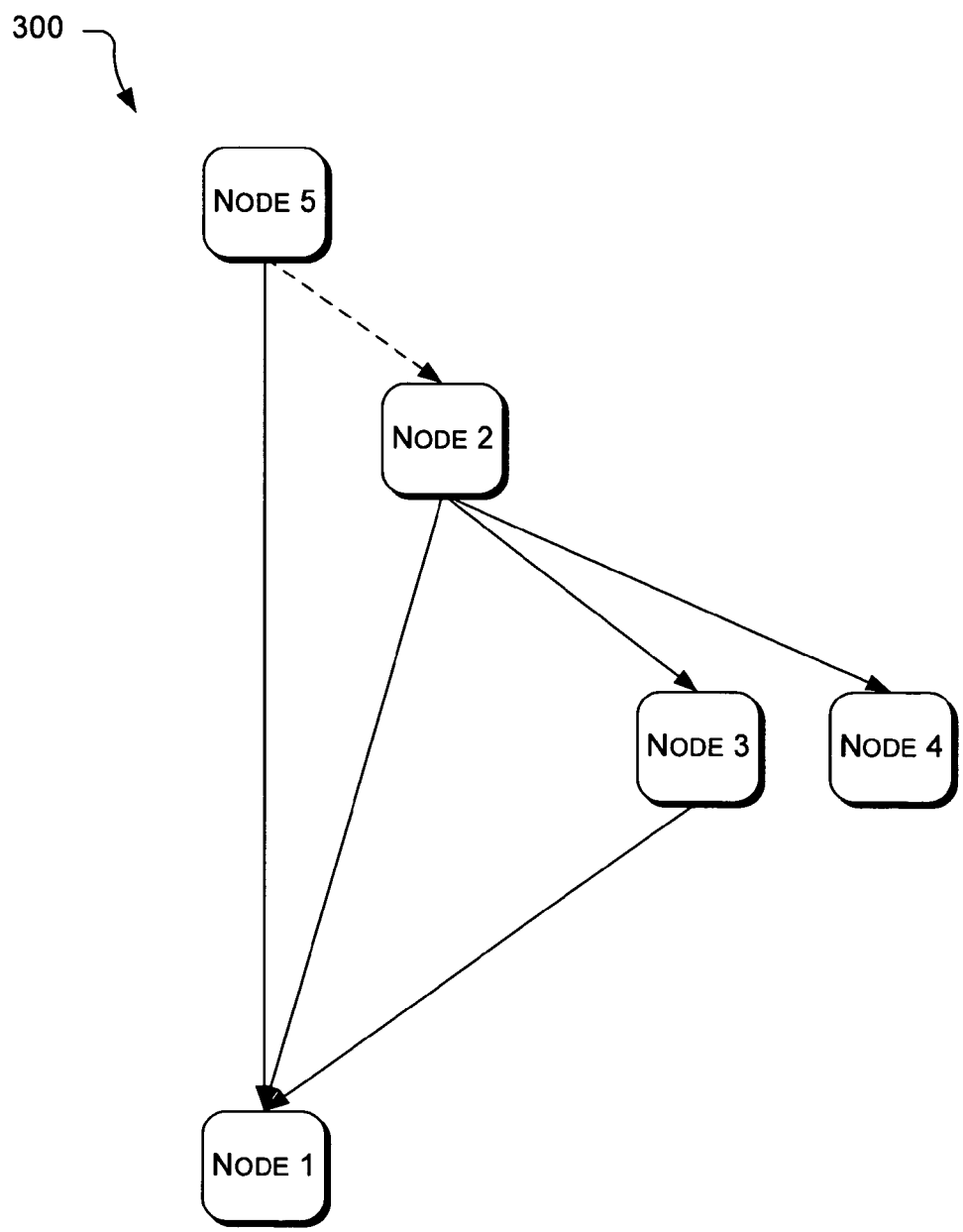
FIG. 3 illustrates an exemplary distributed ordering graph including directional dependence based on the system of FIG. 1.

FIG. 3 illustrates another exemplary distributed ordering graph 300 that respects the directional dependency between nodes 5 and 2 in the distributed system 100 (FIG. 1). In the specific scenario illustrated in FIG. 3, it is assumed that the decision of node 2 is directionally dependent upon node 5. The arrows in the distributed ordering graph 300 indicate the flow of local decision from upstream nodes to downstream nodes. The dashed arrow between node 5 and node 2 indicates that a cycle of constraints exists between node 5 and node 2. This means that node 2 cannot make its decision without first obtaining a certain decision or data from node 5.

The directional dependence of node 2 upon node 5 is indicated with the dotted line from node 5 to node 2. With reference to FIG. 2 and FIG. 3, it can be seen that FIG. 3 arranges the nodes differently than shown in FIG. 2. Note that in FIG. 2, the order does not comply with the directional dependency of node 2 upon node 5. When two nodes are ordered in such a way that they do not comply with the directional dependency, the order is referred to as a "noncompliant order".

Because of the noncompliant order in FIG. 2, in the directional dependency graph 300, node 5 is reordered to comply with directional dependency. Specifically, node 5 is ordered upstream of node 2. In the relatively simple system of FIG. 3, reordering the nodes to remedy a noncompliant order is rather simple. However, reordering nodes may not be easily achieved in other more complicated systems.

In particular, in a distributed system that contains a cycle, the nodes cannot be simply reordered to comply with directional dependencies. A cycle is a set of two dependencies between two decision nodes whereby each of the two decision nodes are mutually dependent upon each other. Thus, a cycle exists if a first node is directionally dependent upon a second node, which in turn is directionally dependent upon the first node. If a cycle exists between two nodes, the mutual dependency between them cannot be resolved simply by reordering the nodes.

The graphs described herein, including the distributed ordering graph 200 shown in FIG. 2 and the ordering graph 300 shown in FIG. 3, can be implemented in software. For example, a data structure can be created that lists the nodes in the appropriate order. The data structure includes dependency relation information identifying constraints or dependencies between pairs of nodes. Those skilled in the art will recognize other ways of implementing the graphs described herein.

Figure 4:
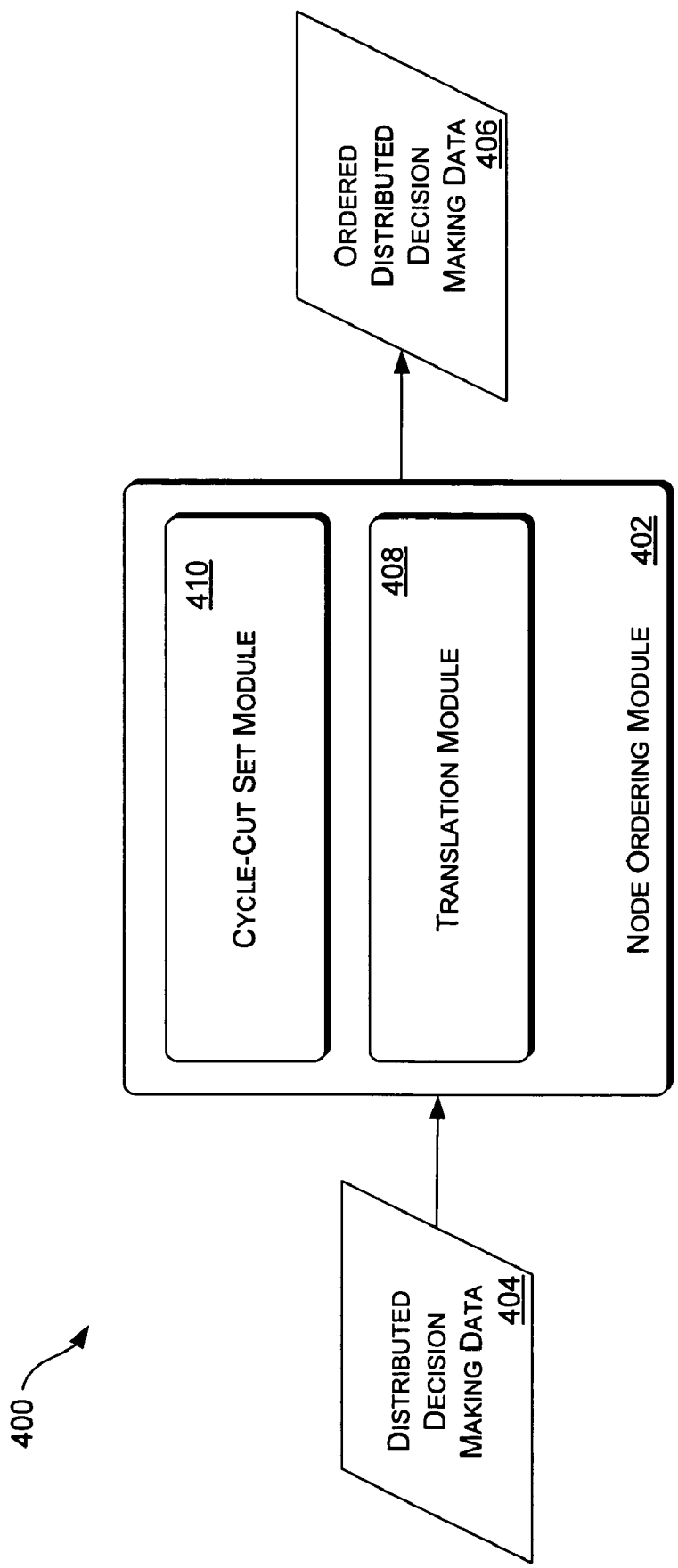
FIG. 4 illustrates an exemplary node ordering module that uses distributed decision data to generate an ordered list of nodes that complies with directional dependencies while minimizing distributed backtracking.

FIG. 4 illustrates an exemplary system 400 for determining an order of a plurality of nodes such that distributed backtracking will be minimized and directional dependencies are complied with. The exemplary system 400 includes a node ordering module 402 that uses distributed decision input data 404 to generate an ordered list of nodes 406.

In accordance with an implementation of the node ordering module 402, an ordered list of nodes 406 is generated by determining a cycle-cut set and ordering the nodes in accordance with the cycle-cut set. Generally, the cycle-cut set includes one or more dependency links between nodes in the distributed decision data 404 that will be in the non-compliant direction in the final ordering graph. Cycle-cut sets are discussed in further detail below.

In accordance with one implementation, the distributed decision data 404 includes a distributed dependency graph. In this implementation, the distributed decision input data 404 identifies the nodes to be included in a distributed decision making process, and identifies any dependencies between the nodes. The distributed decision input data 404 may also define a problem to be solved or provide other information relevant to the ordering.

One implementation of the distributed decision input data 404 also includes a weight for each of the dependency links between dependent nodes. Each of the weights indicates the relative importance of an associated dependency. Thus, a more important dependency is given a higher weight.

The node ordering module 402 identifies links in the distributed ordering data that create cycles and orders the nodes such that backtracking is minimized. To do this, the node ordering module 402 determines a cycle-cut set that includes one or more dependency links that are part of a cycle, but are relatively less important than other dependency links.

After the cycle-cut set is determined, the nodes are ordered in a manner based on the cycle-cut set. For each dependency link that is not in the cycle-cut set, the node ordering module 402 places the dependent node of the dependency link downstream from the other node in the dependency link. As a result, the directional dependencies are oriented such that most of the dependencies are from downstream nodes to upstream nodes. The node ordering module 402 then outputs the ordered list of nodes 406.

In accordance with one implementation of the node ordering module 402, the cycle-cut set is selected according to a minimized aggregate weight policy. According to the minimized aggregate weight policy, the cycle-cut set includes one or more dependency links wherein the sum of the weights of the associated dependency links is minimized. Thus, the minimized aggregate weight policy generally results in an ordering graph in which most of the dependencies are from downstream nodes to upstream nodes.

In accordance with one implementation of the system 400, the ordered list of nodes 406 is an ordering graph in which the links identified in the cycle-cut set are oriented in the non-compliant direction.

Figure 5:
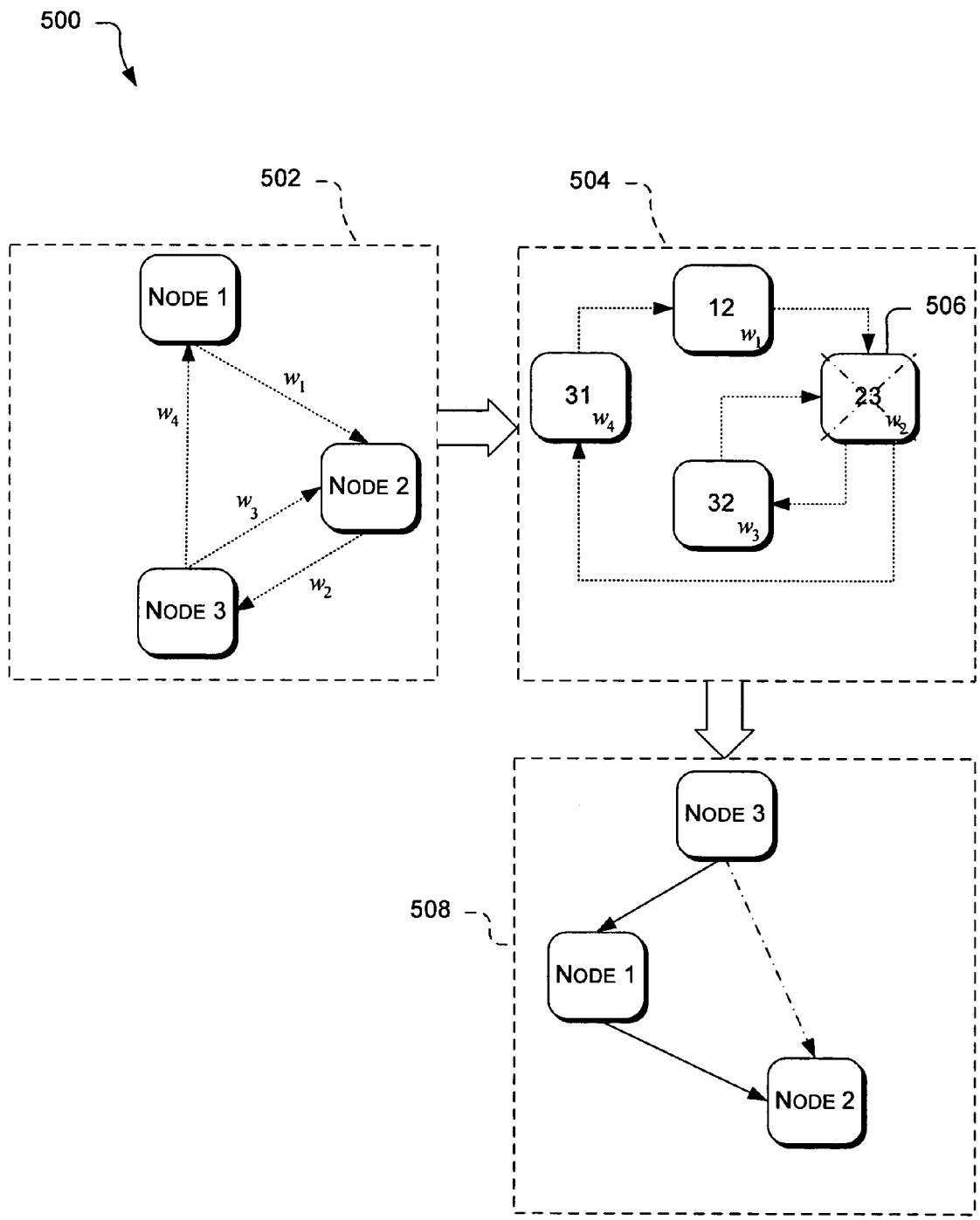
FIG. 5 illustrates an exemplary scenario in which an ordering graph is generated using a cycle-cut set selection to minimize distributed backtracking.

In accordance with one implementation of the node ordering module 402, a translating module 408 and a cycle-cut set module 410 are included therein. The translating module 402 translates the distributed decision input data 402 into a dual dependency graph to assist in the cycle-cut set determination. An exemplary dual dependency graph is shown in FIG. 5 and discussed further below. Briefly, a dual dependency graph expresses node dependencies by treating each dependency link as a node. Each dependency link can be further characterized by an importance weight. The dual dependency graph is input to the cycle-cut set module 410.

The cycle-cut set module 410 chooses a set of one or more dependency links from the dual dependency graph according to the minimum aggregate weight policy. The cycle-cut set can be determined using an algorithm, which could be as primitive as a depth-first search, or one of various specialized algorithms known in the art. An exemplary dual graph and weight minimization function is shown in FIG. 5 and discussed further below.

In another implementation of the node ordering module 402, the cycle-cut set module 410 is not included in the node ordering module 402, but is a separate module. Furthermore, although various functions are described herein with respect to certain modules, in accordance with other implementations, the functions are not limited to those modules but may be carried out by other modules.

FIG. 5 illustrates an exemplary problem solving, or decision making scenario 500 including translating, cycle-cut set determination, and node ordering that could be carried out by the node ordering system of FIG. 4. It is to be understood that the scenario shown in FIG. 5 is for illustration purposes only, and that implementations of node ordering systems and methods described herein are not limited to any particular distributed systems, nodes, or dependencies.

Generally, the decision making scenario 500 includes a weighted directional dependency graph 502 that is first translated into a dual graph 504. The dual graph 504 is then used to generate a cycle-cut set 506 (indicated by dotted-dashed crossed lines). Finally, an ordering graph 508 is generated. As shown, the ordering graph 508 has nodes ordered based on the cycle-cut set 506.

More specifically, the weighted directional dependency graph 502 includes 3 nodes, labeled node 1, node 2, and node 3. The nodes are linked with dependency links indicated by dotted arrows. The dotted arrows indicate an order of node dependency. For example, node 1 depends on the output of node 3. Likewise, node 2 depends on the output of node 3. Node 2 also depends on the output of node 1. Node 3 depends on the output of node 2. Each of the dependency links is labeled with a weight: $w_1$, $w_2$, $w_3$, and $w_4$.

In one implementation, the weights, $w_1$, $w_2$, $w_3$, and $w_4$, are each assigned by the corresponding nodes. In this implementation, each node is responsible for assigning weights to the node's output link. The weights are an expression of certain internal attribute(s) of the nodes. To illustrate, node 1 assigns $w_1$ to the dependency link from node 1 to node 2, based on attributes of node 1. For example, the weight, $w_1$, may be greater when more operations at node 1 are dependent upon information from node 2.

According to one implementation, a cycle-cut set can be determined based on the directional dependency graph 502. The following formula can be used to determine links to include in the cycle-cut set:

$$\text{Minimize}\left(\sum_{i=1}^{n} wt(removedLink_i)\right),$$

wherein $wt(removedLink_i)$ is a function that returns the weight of the $i^{th}$ link that will be removed from further computation and place in the cycle-cut set. In this implementation, the dependency links that satisfy the minimization formula are added to the cycle-cut set and used to generate the ordering graph 508.

In another implementation, the weighted directional dependency graph 502 is translated into the dual graph 504. In the dual graph 504, dependency links from the directional dependency graph 502 are converted into dependency nodes that are labeled with the node numbers of the dependency link. For example, dependency node {12} represents the dependency link between node 1 and node 2. In addition, the dependency nodes are labeled with the corresponding weight. For example dependency node {12} is labeled with weight $w_1$. In the dual graph 504, a link between any two nodes means the nodes share a common endpoint in the directional dependency graph 502. For example, in the directional dependency graph 502, the link from node 1 to node 2 and the link from node 2 to node 3 share a common point in node 2. That is why in the dual graph 504 node "12" and node "23" are connected.

The dual graph 504 is used to determine the cycle-cut set 506. As can be seen, two cycles exist in the dual graph 504. A first cycle extends from node 1, to node 2, to node 3, and back to node 1. A second cycle extends from node 2 to node 3 and back to node 2. Common to both these cycles is the dependency node {23}. Thus, dependency node {23} represents noncompliant links that create both cycles.

In addition, it is desirable to put the nodes in a sequence that minimizes the number or weight of noncompliant links in the ordering graph of nodes. Thus, the weights can be used to determine the least important dependency links. If it is assumed that the weights, $w_1$, $w_2$, $w_3$, and $w_4$, are equal, then dependency node {23} includes a set of noncompliant links that minimize the aggregate weight of dependency nodes in the cycle-cut set 506.

Using the dual graph a cycle-cut set can be determined using a function of the following form:

$$\text{Minimize}\left(\sum_{i=1}^{n} wt(removedNode_i)\right),$$

wherein $wt(removedNode_i)$ is a function that returns the weight associated with the $i^{th}$ dependency node in the dual graph 504.

In a more complicated weighted directional dependency graph that includes additional cycles, the weights would need to be further considered when determining the cycle-cut set. In such a graph, one or more dependency nodes of the corresponding dual graph would be included in the cycle-cut set such that the sum of the corresponding weights would be minimized. As a result, the number of directional constraints that are arranged in the non-compliant direction is reduced in the ordering graph.

The ordering graph 508 expresses the sequence in which a problem will be solved (or a decision made) in the distributed system, wherein portions of the problem are distributed to nodes 1, 2, and 3 within the system. Local solutions flow from upstream nodes to downstream nodes. The arrows between each of the nodes indicate the direction that local decisions flow. The nodes in the ordering graph 508 are arranged based on the cycle-cut set 506. As shown in the ordering graph 508, node 3 is placed furthest upstream in the order. This means that node 1 and node 2 process their portion of the problem after node 3 processes its portion of the problem.

Although the link from node 3 to node 2 contains a dependency that is oriented in the non-compliant direction, most of the directional dependencies are correctly oriented (i.e., from downstream to upstream). Specifically, the dependence of node 1 upon node 3 is correctly oriented, with node 1 being downstream from node 3. Also, the dependence of node 2 upon node 3 is correctly oriented, with node 2 being downstream from node 3. The node arrangement of the ordering graph 508 therefore minimizes the likelihood of distributed backtracking.

According to the ordering graph 508, node 3 will generate and output a solution (or other data) associated with a portion of a given problem. Node 1 will receive the output of node 3 and generate a solution (or other data) associated with a portion of the given problem based on the output of node 3. Similarly, node 2 will receive the output of node 3 and generate a solution (or other data) associated with a portion of the given problem based on the output of node 3.

Exemplary Operations

Figure 6:
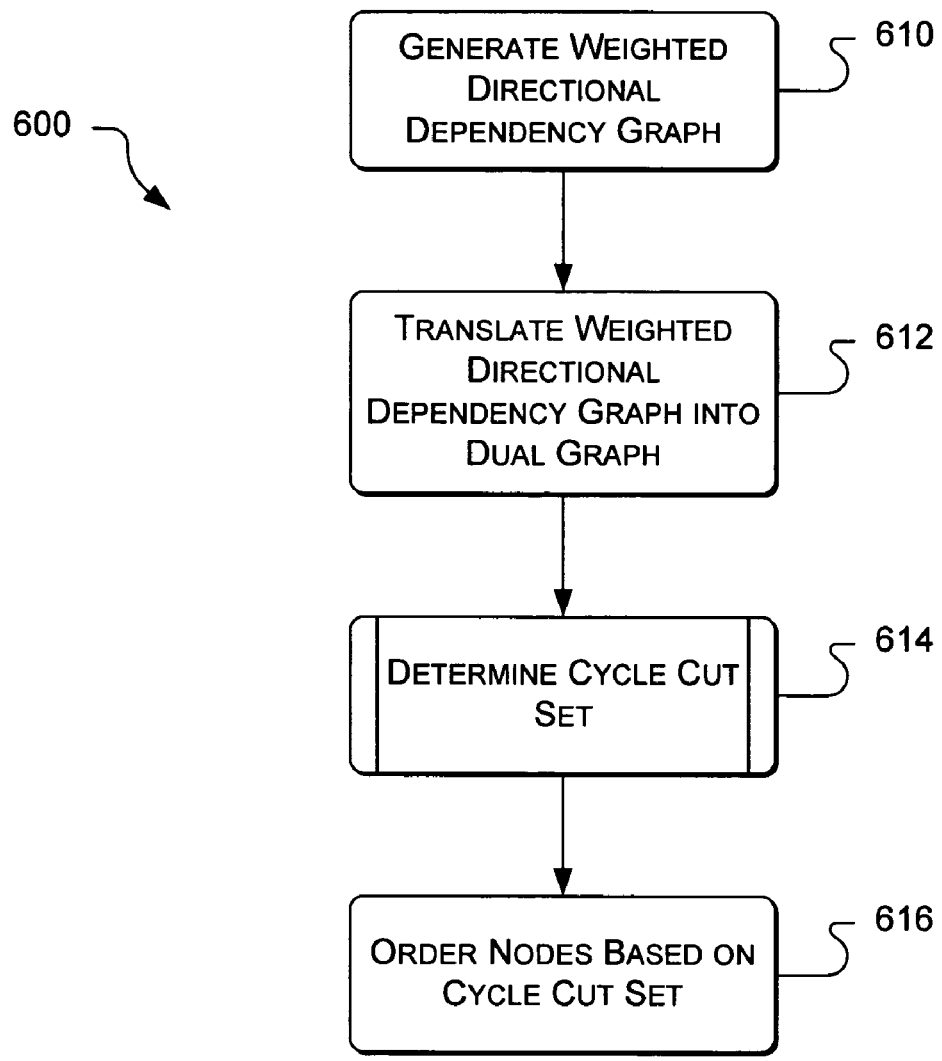
FIGS. 6–7 are flowcharts illustrating algorithms that include exemplary operations for generating a dependency-compliant, ordered list of decision nodes based on a cycle-cut set.

FIG. 6 illustrates a node ordering algorithm 600 having exemplary operations for generating a node order that complies with directional dependencies. Because each problem may have its own unique constraints, inputs, and definition, the exemplary operations in the algorithm 600 are typically performed prior to solving a given problem.

A generating operation 610 generates a weighted directional dependency graph of nodes. The weighted directional dependency graph indicates dependencies among nodes and associated weights to indicate the relative importance of the dependencies. In one implementation of the generating operation 610, each node assigns a weight to dependency links associated with the node.

A translating operation 612 translates the weighted directional dependency graph into a dual graph. The dual graph expresses each dependency link as a weighted node.

A determining operation 614 determines a cycle-cut set. The cycle-cut set is a set of dependency links that will be ordered in the non-compliant direction in the final ordering graph. The determining operation 614 can employ any of a number of selection processes for selecting the dependency links in the cycle-cut set. One particular implementation of the determining operation 614 is illustrated in FIG. 7 and described below.

An ordering operation 616 orders the nodes in accordance with the cycle-cut set by arranging the nodes such that dependency links in the cycle-cut set are in the non-compliant direction. In other words, the cycle-cut set may result in a dependant node being upstream of the node from which it depends, and because the dependant node is upstream, it has to make its local decision without information from the node that is dependant on (which might result in backtracking). As a result, the ordering operation 616 reduces the likelihood of backtracking by placing nodes upstream that are less likely to be dependent upon downstream nodes. The output of the node ordering algorithm 600 is an ordering graph that specifies the order in which local decisions are made or local solutions are generated in a distributed decision making process.

Figure 7:
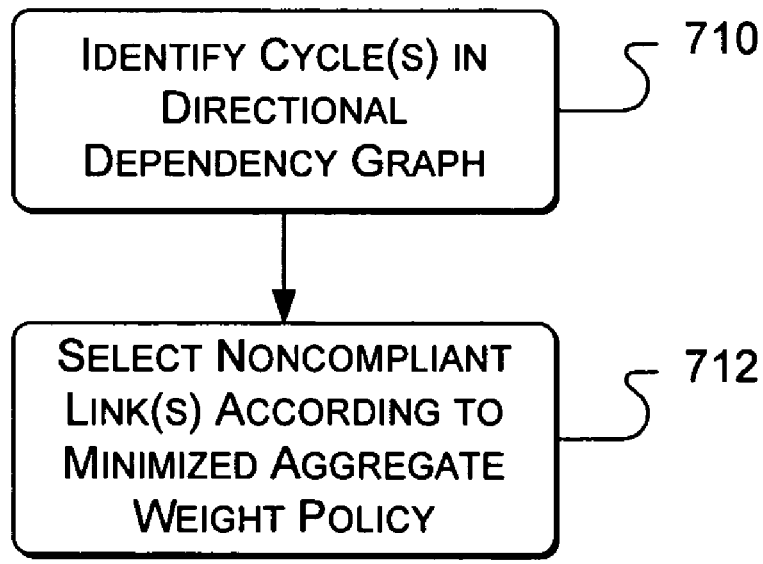

FIG. 7 illustrates an exemplary implementation of the cycle-cut set determining operation 614. Initially, an identifying operation 710 identifies a cycle in the directional dependency graph. The selecting operation 712 then selects the least important dependency link that forms part of the identified cycle and puts the selected dependency link into the cycle-cut set. The cycle-cut set determining operation 614 is repeated until all cycles are identified in the directional dependency graph and associated dependency links are selected.

Exemplary Computing Device

Figure 8:
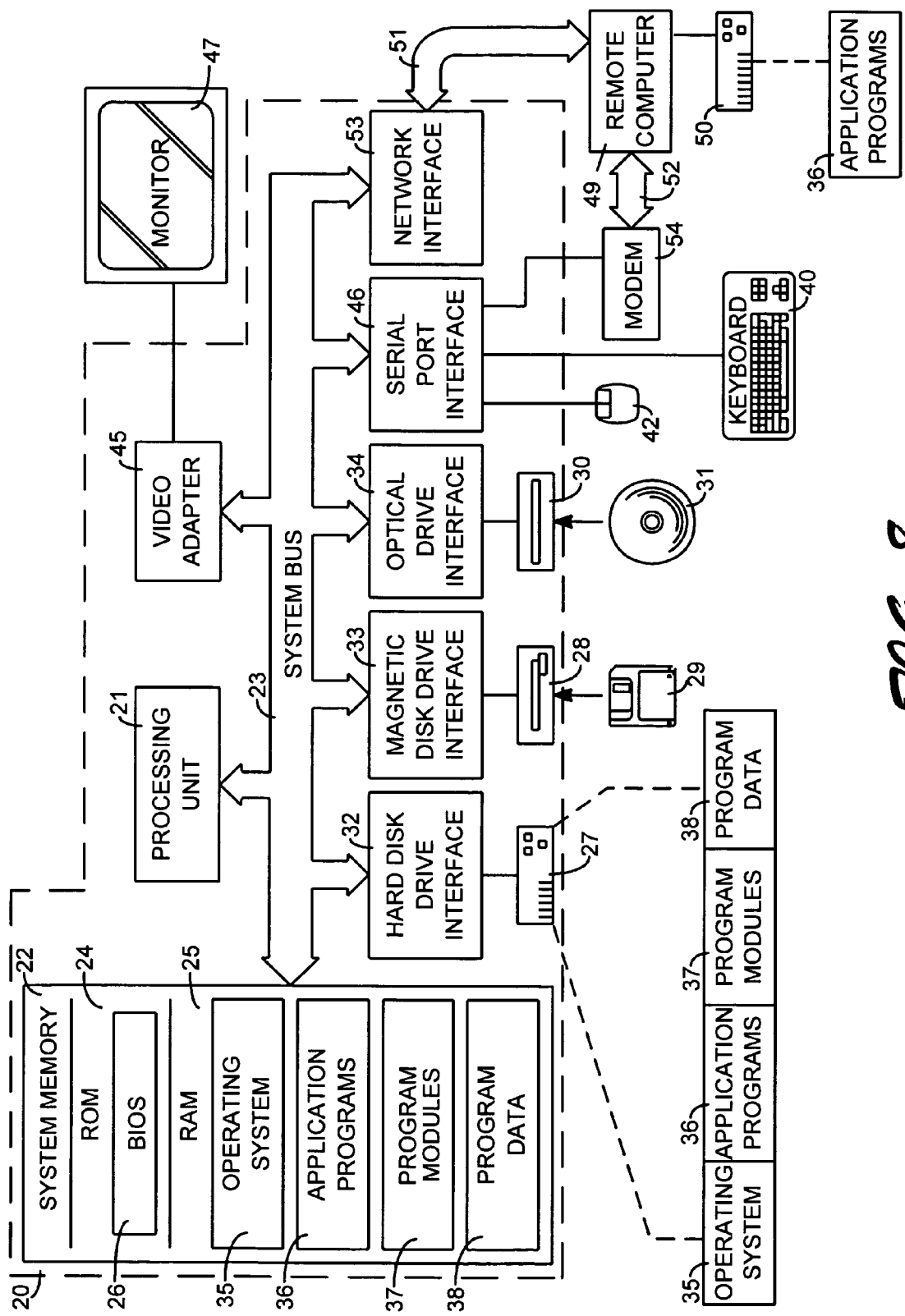
FIG. 8 illustrates a suitable computing environment for implementing the systems and processes described herein.

With reference to FIG. 8, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 45. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 8 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media".

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, or program modules. Communication media also includes any information delivery media. By way of example, and not limitation, communication media includes wired media such as a wired network or direct-wired connection, and wireless media such as acoustic, RF, infrared, and other wireless media.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A method for ordering a plurality of decision nodes in a distributed system, the method comprising:
   generating a weighted directional dependency graph including one or more dependency links between two nodes;
   determining a cycle-cut set identifying one or more dependency links that form a cycle in the weighted directional dependency graph; and
   ordering the plurality of decision nodes based on the cycle-cut set, wherein the ordering comprises arranging the plurality of nodes such that the dependency links identified by the cycle-cut set are in a non-compliant direction.

2. A method as recited in claim 1 wherein the determining comprises:
   identifying a cycle in the weighted directional dependency graph;
   selecting a dependency link in the cycle according to a minimized aggregate weight policy.

3. A method as recited in claim 1 further comprising generating an ordering graph that specifies an order in which information flows in the distributed system.

4. A method as recited in claim 1 further comprising translating the weighted directional dependency graph into a dual graph.

5. A method as recited in claim 1 further comprising determining a weight for one or more of the dependency links in the weighted directional dependency graph.

6. A method as recited in claim 1 wherein at least one weight in the weighted directional dependency graph is assigned by an associated node.

7. A method as recited in claim 1 further comprising performing a branch and bound algorithm to solve a problem.

8. A method as recited in claim 1 wherein the determining step comprises performing a depth-first search.

9. A method as recited in claim 1 wherein the determining step comprises performing a stochastic search.

10. A method as recited in claim 1 wherein the weighted directional dependency graph comprises an ordered list of the plurality of nodes, wherein at least two of the nodes are associated with a constraint relationship.

11. A computer system for ordering a plurality of decision nodes in a distributed system, comprising:
    a memory having stored thereon a weighted directional dependency graph defining one or more dependency links in a distributed system having a plurality of nodes, the weighted directional dependency graph further defining a weight for each of the dependency links, wherein each of the one or more dependency links expresses a dependency between two associated nodes;
    a node ordering module generating a node order based on a cycle-cut set identifying at least one of the one or more dependency links that form a cycle in the weighted directional dependency graph, wherein the node order comprises arranging the plurality of nodes such that the dependency links identified by the cycle-cut set are in a non-compliant direction.

12. A computer system as recited in claim 11 wherein each of the plurality of nodes having an associated dependency assigns a weight to the associated dependency link.

13. A computer system as recited in claim 11 wherein the node ordering module comprises a cycle-cut set module that selects the at least one dependency link according to a minimized aggregate weight policy.

14. A computer system as recited in claim 11 wherein the node ordering module comprises a translating module that translates the weighted directional dependency graph into a dual graph.

15. A computer system as recited in claim 13 wherein the cycle-cut set module identifies a cycle in the weighted directional dependency graph.

16. A computer system as recited in claim 11 wherein the node ordering module arranges the nodes based on the cycle-cut set to create an ordering graph.

17. A computer system as recited in claim 11 wherein the node ordering module comprises a cycle-cut set module that identifies a cycle in the weighted directional dependency graph using a depth-first search.

18. A computer system as recited in claim 11 wherein the one or more dependency links are characteristic of a problem to be solved by the plurality of nodes.

19. A computer-readable medium having stored thereon computer-executable instructions for causing a computer to order a plurality of decision nodes in a distributed system, comprising:
    translating a weighted directional dependency graph representing dependency links among a plurality of nodes into a dual graph;
    identifying one or more cycles expressed in the dual graph;
    generating a cycle-cut set including at least one of the one or more cycles from the weighted directional dependency graph;
    based on the cycle-cut set, generating an ordering graph representing an order of information flow in a distributed system.

20. A computer-readable medium as recited in claim 19, wherein generating the cycle-cut set comprises:
    selecting a dependency link from the one or more cycles based on a minimized aggregate weight;
    including the selected dependency link in the cycle-cut set.

21. A computer-readable as recited in claim 19, the process further comprising assigning a weight to each of the dependency links in the weighted directional dependency graph.

22. A computer-readable medium as recited in claim 21, wherein the assigning comprises determining a weight that indicates relative importance of the associated dependency link.

23. A computer-readable medium as recited in claim 19, wherein the translating comprises expressing each of the dependency links as a weighted dependency node.

24. A computer-readable medium as recited in claim 19, wherein generating the cycle-cut set comprises applying a function of the form:

$$\text{Minimize}\left(\sum_{i=1}^{n} wt(removedLink_i)\right),$$

wherein the function Minimize minimizes the summation, the function wt returns a weight associated with a dependency link to be included in the cycle-cut set, removedLink$_i$, and i is an index ranging from 1 to n, n being the total number of dependency links.

25. A computer-readable medium as recited in claim 19 wherein generating the cycle-cut set comprises performing a depth-first search to identify the one or more cycles.

* * * * *